(12) United States Patent
Patrick

(10) Patent No.: US 7,469,770 B2
(45) Date of Patent: Dec. 30, 2008

(54) ANECHOIC VISCO-THERMAL LINER

(75) Inventor: William P. Patrick, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 300 days.

(21) Appl. No.: 11/477,290

(22) Filed: Jun. 29, 2006

(65) Prior Publication Data

US 2008/0000717 A1    Jan. 3, 2008

(51) Int. Cl.
*G10K 11/16* (2006.01)
*E04B 1/84* (2006.01)
*G10K 11/04* (2006.01)
*E04B 1/82* (2006.01)

(52) U.S. Cl. .................. 181/210; 181/293; 181/288
(58) Field of Classification Search .............. 181/214, 181/210, 293, 292, 286, 288
See application file for complete search history.

(56) References Cited

U.S. PATENT DOCUMENTS

| | | | |
|---|---|---|---|
| 1,554,179 A * | 9/1925 | Trader | 181/293 |
| 1,554,180 A * | 9/1925 | Trader | 52/144 |
| 1,804,884 A * | 5/1931 | Mazer | 181/293 |
| 1,878,409 A * | 9/1932 | Lyford | 181/286 |
| 1,972,592 A * | 9/1934 | Jacobson | 181/292 |
| 2,412,713 A * | 12/1946 | Burt | 181/293 |
| 2,459,121 A * | 1/1949 | Willey et al. | 181/293 |
| 2,671,522 A * | 3/1954 | Bourgeois | 181/293 |
| 2,838,806 A * | 6/1958 | Sabine | 52/145 |
| 2,990,027 A * | 6/1961 | Sabine | 181/291 |
| 3,094,188 A * | 6/1963 | Eustachio | 181/293 |
| 3,649,430 A * | 3/1972 | Lewis et al. | 428/138 |
| 3,850,261 A * | 11/1974 | Hehmann et al. | 181/286 |
| 3,887,031 A * | 6/1975 | Wirt | 181/286 |
| 4,091,892 A * | 5/1978 | Hehmann et al. | 181/286 |
| 4,113,053 A * | 9/1978 | Matsumoto et al. | 181/284 |
| 4,158,401 A * | 6/1979 | Matsumoto et al. | 181/210 |
| 4,160,491 A * | 7/1979 | Matsumoto et al. | 181/284 |
| 4,244,439 A * | 1/1981 | Wested | 181/210 |
| 4,248,647 A * | 2/1981 | Herron et al. | 156/84 |
| 4,296,831 A * | 10/1981 | Bennett | 181/224 |
| 4,327,816 A * | 5/1982 | Bennett | 181/292 |
| 4,436,179 A * | 3/1984 | Yamamoto et al. | 181/210 |
| 4,607,466 A * | 8/1986 | Allred | 52/144 |
| 4,850,093 A | 7/1989 | Parente | |
| 5,025,888 A | 6/1991 | Arcas et al. | |
| 5,151,311 A | 9/1992 | Parente et al. | |
| 5,782,082 A | 7/1998 | Hogeboom et al. | |

(Continued)

FOREIGN PATENT DOCUMENTS

CH    660609 A5 *    5/1987

*Primary Examiner*—Edgardo San Martin
(74) *Attorney, Agent, or Firm*—Carlson, Gaskey & Olds

(57) ABSTRACT

A liner assembly includes a plurality of aligned passages providing a large open area combined with openings much smaller than a length of the passages. The plurality of passages are disposed parallel with each other and include an opening transverse to incident sound waves. The passages are separated by walls and are blocked at an end distal from the openings. Sound waves incident on a face of the liner enter the passages and are dissipated by viscous losses. Sound energy is further dissipated as thermal energy to the walls of the passages. The long narrow passages provide the desired visco-thermal losses for sound energy in a broad frequency range.

17 Claims, 5 Drawing Sheets

U.S. PATENT DOCUMENTS

| | | | |
|---|---|---|---|
| 5,962,107 A * | 10/1999 | Lowery et al. | 428/131 |
| 5,975,237 A * | 11/1999 | Welch et al. | 181/290 |
| 6,033,756 A * | 3/2000 | Handscomb | 428/138 |
| 6,179,943 B1 * | 1/2001 | Welch et al. | 156/160 |
| 6,209,679 B1 | 4/2001 | Hogeboom et al. | |
| 6,248,423 B1 * | 6/2001 | Clarke et al. | 428/131 |
| 6,360,844 B2 | 3/2002 | Hogeboom et al. | |
| 6,789,646 B2 * | 9/2004 | Wang et al. | 181/293 |
| 2007/0235253 A1 * | 10/2007 | Hiraku et al. | 181/293 |

* cited by examiner

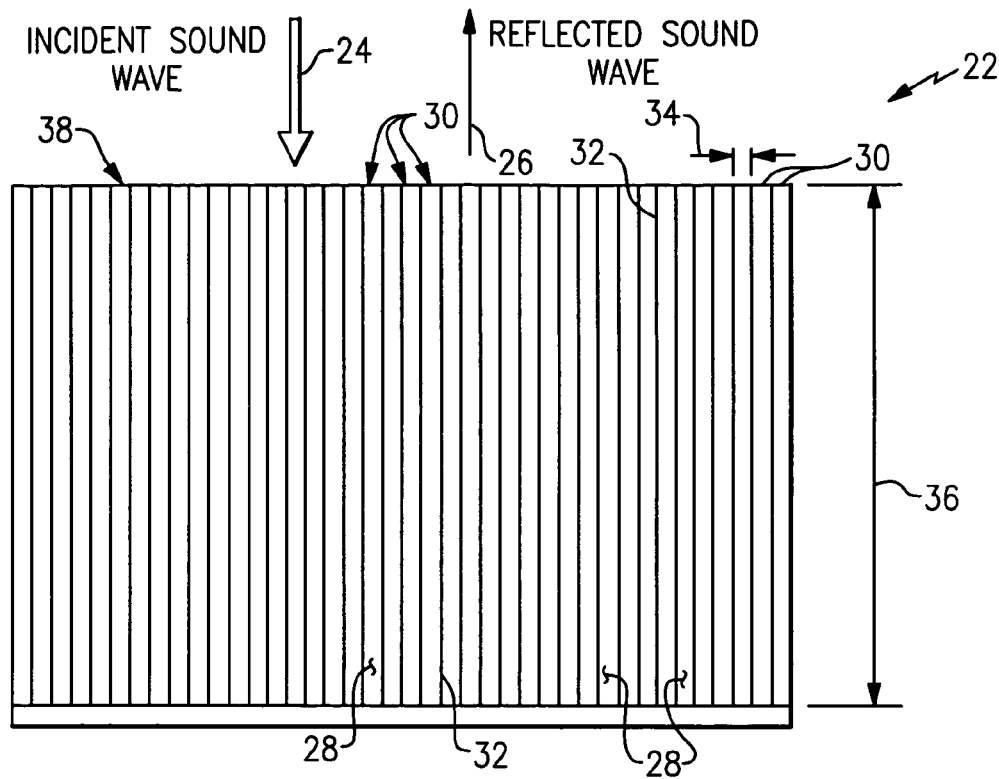
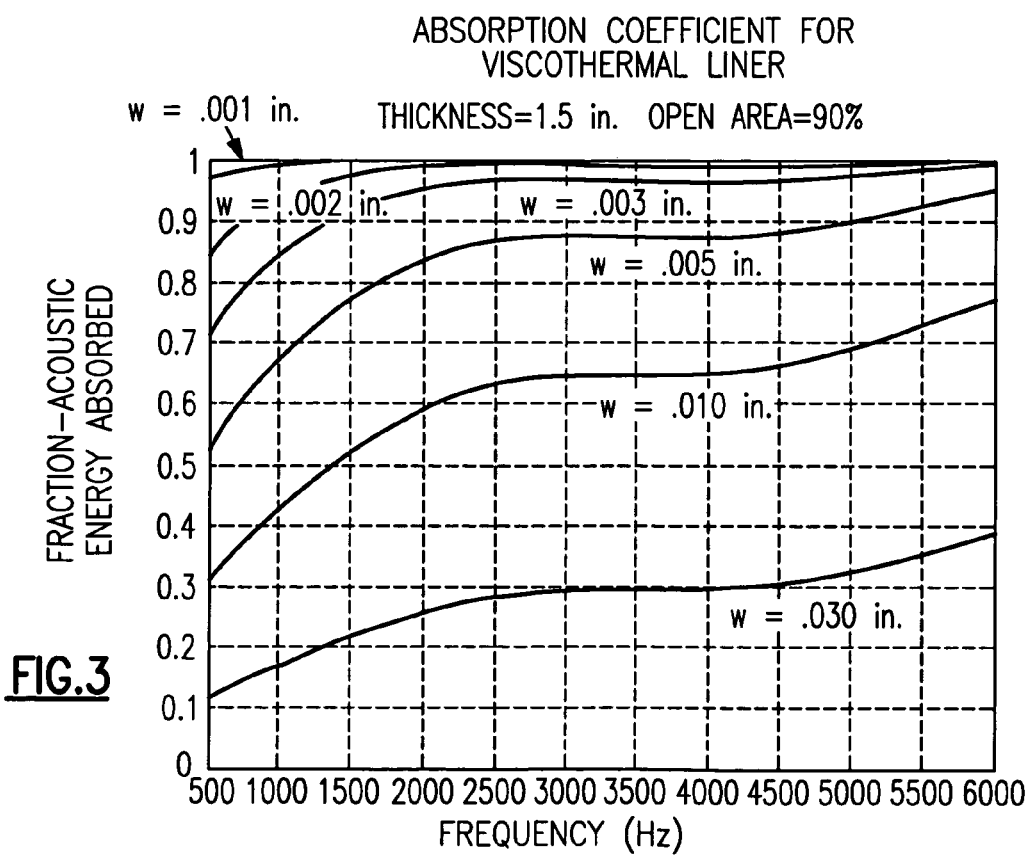

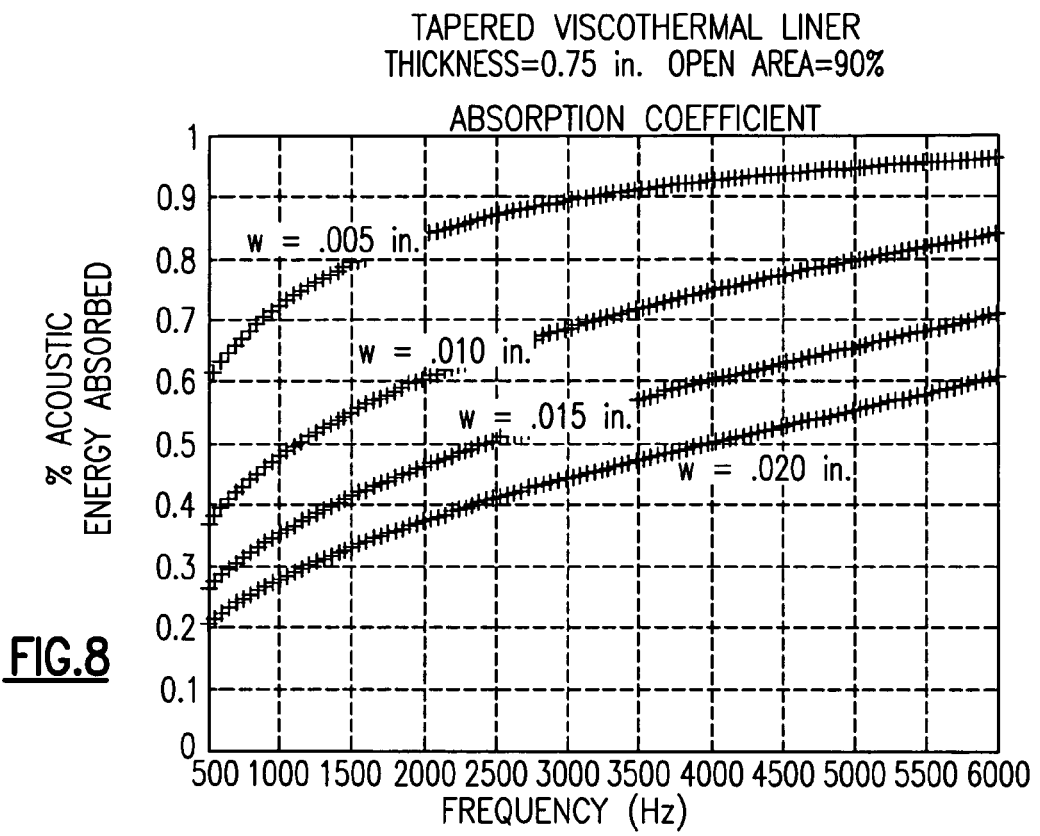
FIG.8
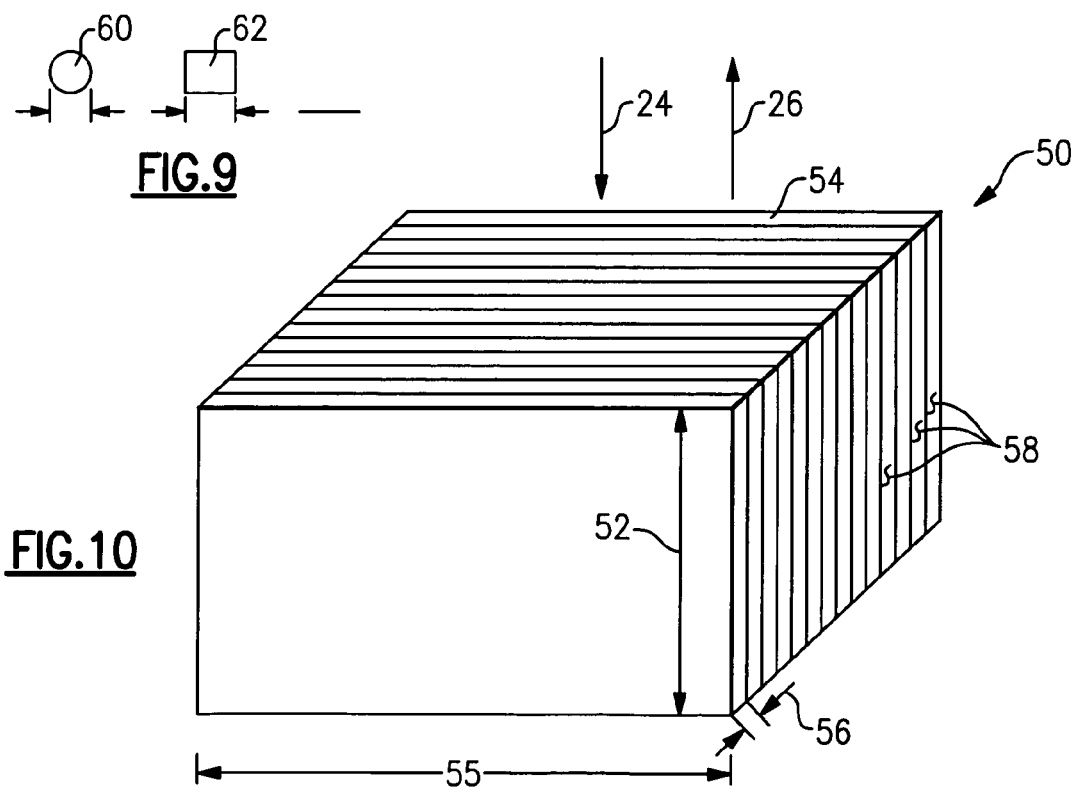
FIG.9
FIG.10

ANECHOIC VISCO-THERMAL LINER

BACKGROUND OF THE INVENTION

This invention generally relates to an acoustic liner. More particularly, this invention relates to an acoustic liner for minimizing reflection of sound from the acoustic liner face.

Conventional nacelle liners include a noise attenuating structure covered by a face sheet including a plurality of openings. The openings communicate noise and acoustic energy through to the noise attenuating structure where the acoustic energy is dissipated. The face sheet includes an open area provided by the plurality of openings that is generally less than 20% of the total area of the face sheet. The open area provided by openings within the face sheet is configured to attenuate the most undesirable noise frequencies. The limited and tailored open area prevents sound energy of some frequencies from being dissipated and instead reflects that sound energy back into the nacelle. Greater open area can provide improvements to the range of noise frequencies that can be attenuated.

Disadvantageously, there is a practical limit to the number and size of the openings that can be provided within a face sheet. Further, although possible to tune the liner to attenuate noise of certain frequencies, such tailoring results in a limit to the range of frequencies that can be effectively attenuated. Although increases in open area can increase the range of sound frequencies that can be attenuated, the number and size of openings should also provide desired manufacturing efficiencies, while being balanced against the open area requirements.

Accordingly, it is desirable to develop and design a liner assembly with improved noise attenuation properties that can attenuate a broad range of noise frequencies.

SUMMARY OF THE INVENTION

An example liner assembly includes a plurality of substantially parallel passages that provide a large open area combined with openings much smaller than a length of the passages.

The example liner assembly is dissipative rather than reactive and converts sound energy into heat energy. The example liner assembly includes a plurality of passages substantially parallel and aligned with each other and including an opening transverse to incident sound waves. The passages are separated by walls and are blocked at an end distal from the openings. Sound waves incident on a face of the liner enter the passages and are dissipated by viscous losses.

The sound wave then travels toward the distal end of the liner where it reflects from a substantially rigid back wall and the propagates back toward the liner face. During the time that the acoustic wave propagates from the face of the liner to the distal end and then back to the face of the liner, it is substantially attenuated by the visco-thermal losses within the narrow passages. Minimal acoustic energy escapes from the liner over a wide frequency range and thus the liner is referred to as anechoic. Sound energy is further dissipated as thermal energy to the walls of the passages. Acoustic energy is attenuated through increased visco-thermal losses within the plurality of passages.

Each of the passages includes a length that is much larger than a width of the opening. The long narrow passages provide the desired visco-thermal losses for sound energy in a broad frequency range. The length of the passages, which can be less than 1.0 inches for aircraft liner applications, provide a substantially thinner overall thickness of the liner as compared to conventional liner assemblies.

The width of the openings is very small relative to the length of the passage and is combined with many other passages to provide a relatively large opening area on the face of the liner and to provide a large surface area within the liner to maximize the dissipation of the sound energy within the liner. The opening area of the face is greater than 80%. The large opening area provides a substantially anechoic liner that reflects substantially little sound. The reduction in the amount of noise energy that is reflected from the face provides substantial improvements in the visco-thermal dissipation of noise energy.

Accordingly, an example liner assembly according to this invention provides increased noise attenuation across a broader frequency range than conventionally configured acoustic liners.

These and other features of the present invention can be best understood from the following specification and drawings, the following of which is a brief description.

BRIEF DESCRIPTION OF THE DRAWINGS

FIG. 2 is a cross-sectional view of a portion of an example liner assembly according to this invention.

FIG. 3 is a graph illustrating an example relationship between opening width and absorption of acoustic energy.

FIG. 8 is another graph illustrating another example relationship between opening width and absorption of acoustic energy.

FIG. 9 is a schematic view of several example shapes for the openings in the liner assembly FIG. 10 is a perspective view of another example liner assembly according to this invention.

DETAILED DESCRIPTION OF THE PREFERRED EMBODIMENT

Figure 1:
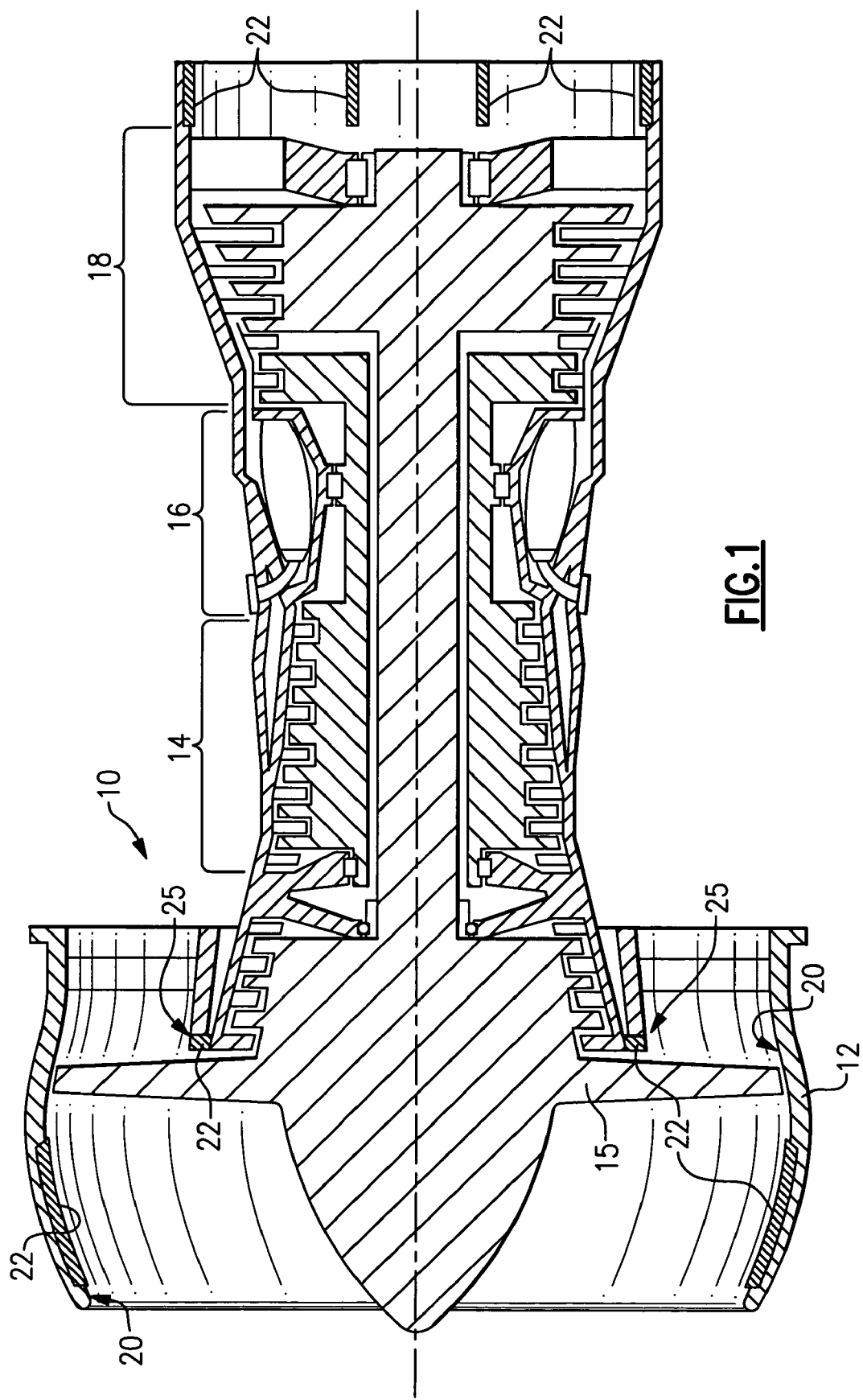
FIG. 1 is a schematic representation of an example aircraft engine and housing according to this invention.

Referring to FIG. 1 an aircraft engine assembly 10 is schematically shown and includes a compressor fan 14 that compresses incoming air that is fed to a combustor 16. In the combustor 16, fuel is mixed with the compressed air and ignited. The resulting high speed exhaust gases drive a turbine 18 that in turn drives the compressor 14. The engine assembly 10 includes a housing 12 that protects the engine assembly from the environment and channels air to the compressor fan 15. The engine assembly 10 generates sound energy that propagates from the housing 12.

The housing 12 includes an inner surface 20 and acoustic liners 22. The acoustic liners 22 are disposed forward of compressor fan 14 and aft of the turbine 18. Although acoustic liners 22 are shown forward and aft in the housing 12, other locations within the housing 12 requiring sound attenuation may also include the acoustic liner 22 such as flow splitters 25. The acoustic liner 22 absorbs sound energy to reduce the magnitude of sound energy emitted from the housing 12. Although an engine assembly 10 is illustrated, other structures or ducts that require attenuation of noise will also benefit from the disclosure of this invention.

Referring to FIG. 2, the example liner 22 includes a plurality of passages 28 aligned parallel to each other. The liner 22 is dissipative rather than reflective to convert sound energy into heat energy. The passages 28 are void of any radical area changes that could reflect sound energy. The liner provides substantial dissipation of sound energy within the passages 28 such that little or no sound energy is reflected back to a face. Each of the passages 28 includes an opening 30 transverse to incident sound waves 24. The passages 28 are separated by walls 32 and are blocked at an end distal from the openings 30. Sound waves incident to a face 38 of the liner 22 enter the passages 28 and are dissipated by viscous losses. Sound energy is further dissipated as thermal energy to the walls 32. Accordingly, the liner 22 attenuates sound energy through increased visco-thermal losses within the plurality of passages 28.

Each of the passages 28 includes a length 36 that is much larger than a width 34 of the opening. The length 36 is at least 90 times the width 34. Preferably the length 36 is greater than 100 times the width 34, and more preferably the length 36 is much more than 100 times the width 34 and is more than 500 times the width 34. The long narrow passages 28 provide the desired visco-thermal losses for sound energy in a broad frequency range.

The length 36 of the passages is between 0.75 inch and 1.5 inches providing for a substantially thinner overall thickness of the liner 22 compared to conventional acoustic liner assemblies. The width 34 of the openings 30 are very small relative to the length 36 of the passage 28 and are combined with many other passages to provide a relatively large opening area on the face 38 of the liner. The opening area of the face 38 is greater than 80% and is preferably within a range of between 90-95%. The large opening area provides a substantially anechoic liner that reflects substantially little sound. The reduction in the amount of noise energy that is reflected from the face 38 provides substantial improvements in the visco-thermal dissipation of noise energy.

The desired open area requires a very small wall thickness to provide the desired small widths 34 of the opening 30. The purpose being to maximize open area and the surface area within the liner by using extremely thin passage walls. Opening widths 34 are desired to be as small as possible to provide the desired ratios of width 34 to length 36. The smaller the width 34 and the thinner the wall 32, the greater the aggregate open area. The desired open area of between 90-95% requires small opening widths 34 for passage lengths 36 in the range of between 0.75-1.5 inches. The corresponding width 34 of the passage 28 is provided at less than 0.002 inches and requires relatively thin wall thicknesses to maintain the desired open area.

Referring to FIG. 3, a graph is shown that illustrates the relationship between a width (w) and the amount of acoustic energy that is absorbed for a liner having an open area at least equal to 90%. The graph illustrates how a liner having a thickness of 1.5 inches can absorb acoustic energy of different frequencies depending on the width (w) of the opening 30. As shown, the percent of acoustic energy for various frequencies increases as the width of the opening is decreased for like open areas. A percent acoustic energy absorbed greater than 90% is considered anechoic. As is illustrated with a 90% open area and opening widths less than 0.002 inches, the liner is substantially anechoic for all frequencies above 750 Hz.

Figure 4:
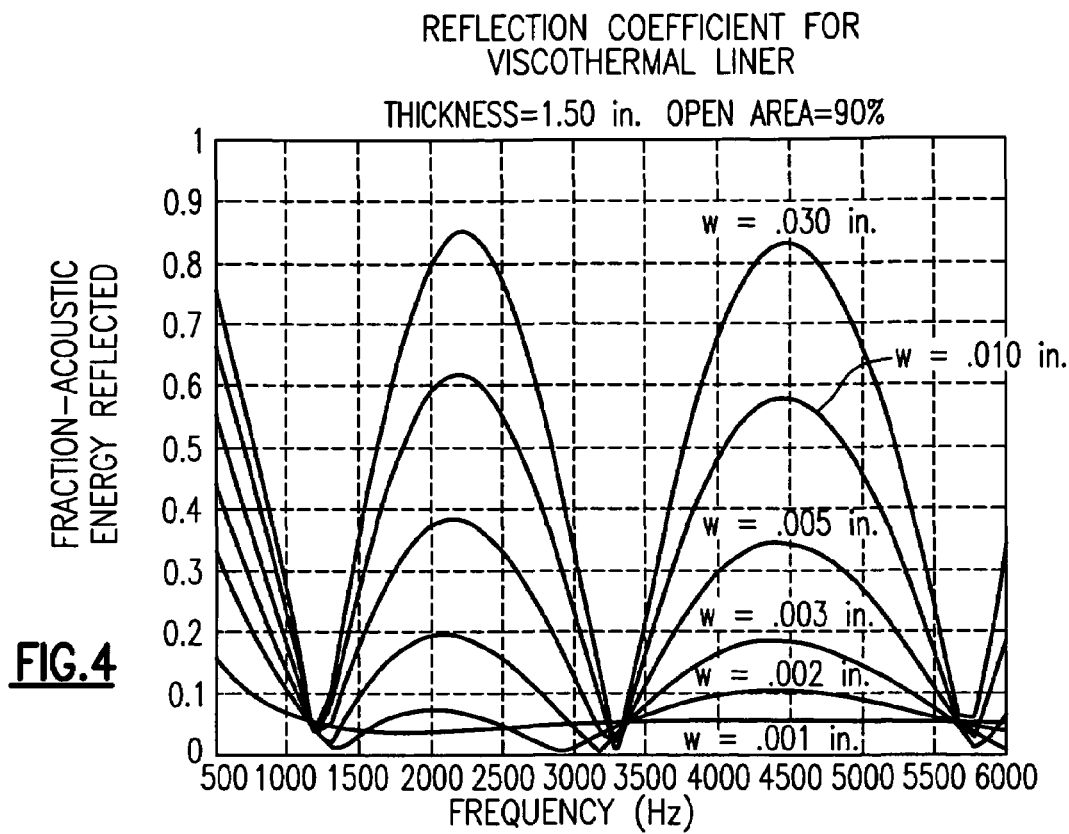
FIG. 4 is another graph illustrating another example relationship between opening width and reflection of acoustic energy.

Referring to FIG. 4, the percent reflected acoustic energy is illustrated as a function of the width (w) over the same frequency range as illustrated in FIG. 3. The graph illustrates how reflective acoustic energy is reduced for most frequencies at opening widths less then 0.002 inches. Opening widths greater than 0.002 show a large increase in reflective energies for specific frequencies. However, at the desired smaller widths (w) the percent of reflective energy is substantially constant for all frequencies. This eliminates the need to tune a face sheet to attenuate the harshest frequencies. The liner 22 with a width less then 0.002 inches simply attenuates all frequencies within the shown broad range.

Figure 5:
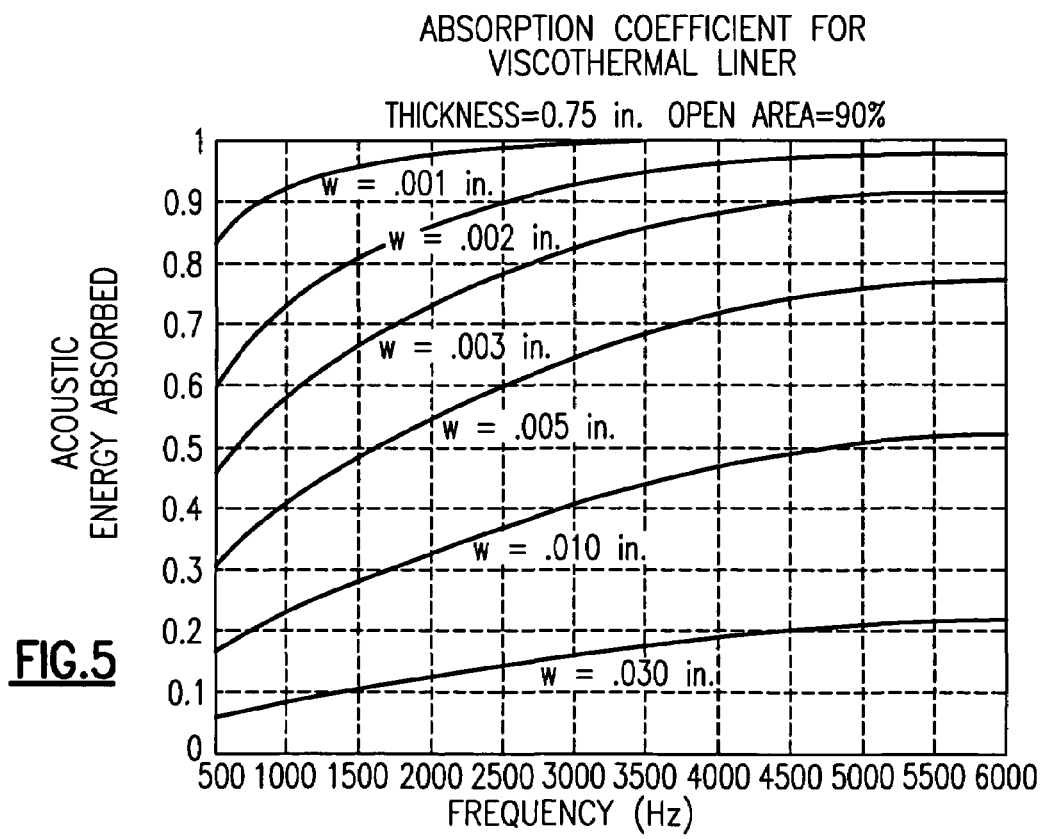
FIG. 5 is graph illustrating another example relationship between opening width and absorption of acoustic energy.

Referring to FIG. 5, a graph illustrates the effects of reducing the thickness or length 36 of the passages from 1.5 inches to 0.75 inches. The shorter passages still provide a substantially anechoic liner 22 for widths less then 0.002 inches for frequencies greater than about 2500 HZ. Accordingly, reduced lengths of the passages 28 can provide substantial absorption of acoustic energy, without significant sacrifice of performance.

The desired open area and opening width can be provided by constructing liner 22 from a ceramic matrix having a plurality of parallel passages with an ultra-thin wall separating each passage. One example ceramic matrix includes 900 passages for each square inch with a wall thickness of 0.002 inches that can provide an open area in the range of approximately 80%.

Figure 6:
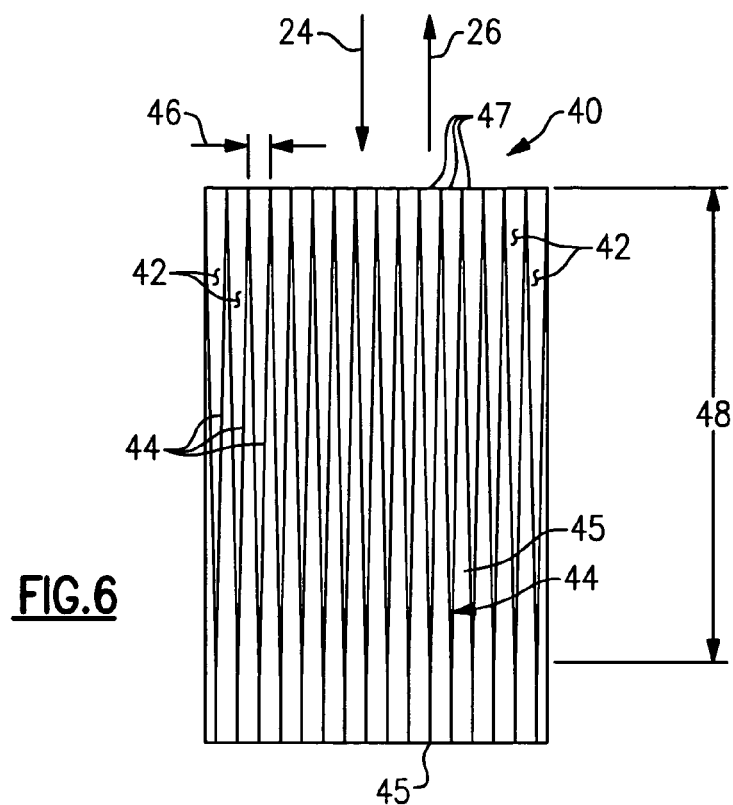
FIG. 6 is a sectional view of another example liner assembly.

Referring to FIG. 6, another example liner 40 is illustrated schematically and includes a plurality of tapered passages 42. The tapered passages 42 include a width 46 that decreases in a direction away from an opening 47. The decreasing width 46 is provided by varying a coating 45 that is applied to the walls 44. The coating 45 can be applied in an electroplating process. Other process that provide for control and variation of a thickness of a coating can also be utilized. The coating 45 is deposited within each passage 42 at a thickness substantially zero near the opening 47 that provides the maximum width 46 for the passage 42. The coating 45 is increased in the direction away from the opening 47 to form a zero or near zero width of the passage at a point distal from the opening 47.

With this process and tapered configuration of the liner 40 a larger opening width can be utilized to provide the desired open area, while the tapered passages provide the desired reduction in passage width that produces the desired visco-thermal losses of acoustic energy. The width 46 of each of the passages 42 begins at a large width 46, for example, 0.010 inches and decreases to substantially zero near end distal from the opening 47.

Figure 7:
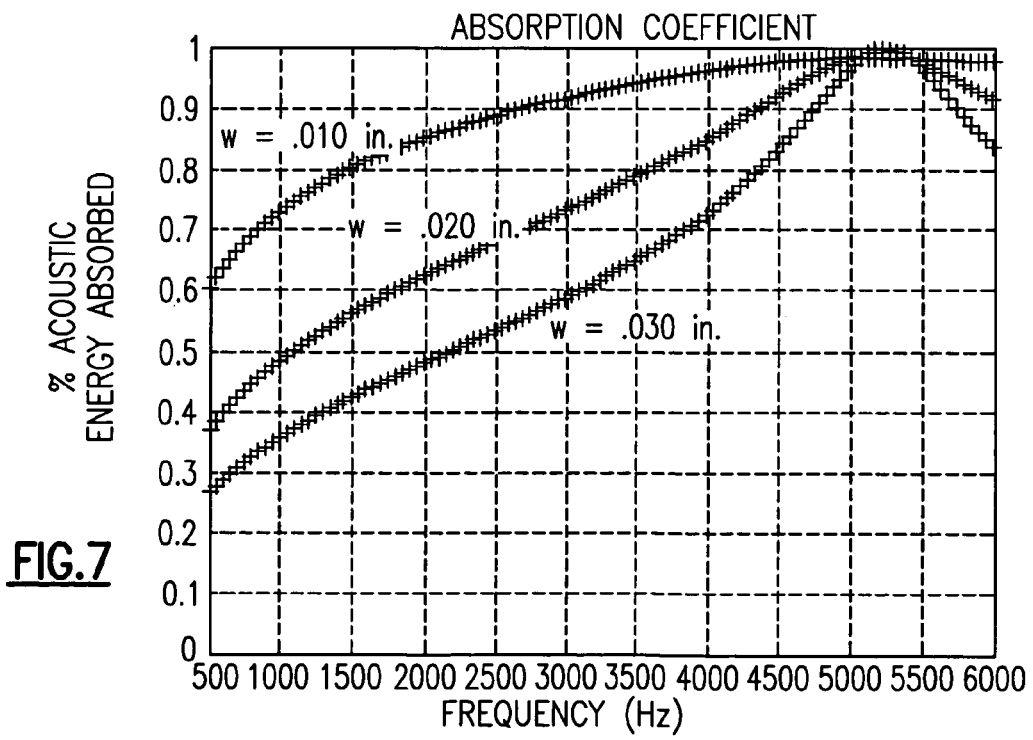
FIG. 7 is a graph illustrating an example relationship between opening width and absorption of acoustic energy for the liner assembly illustrated in FIG. 7.

Referring to FIG. 7, a graph illustrating the acoustic absorption performance of the tapered liner 40 illustrates how greater widths can be utilized to provide a substantially anechoic liner for frequencies greater than 2500 Hz. Further, for opening widths (w) of 0.01 inches measured at the opening 47 approximately 60% of the acoustic energy can be absorbed for frequencies above 500 Hz. The performance of the example tapered liner 40 is for passages having a length of about 1.5 inches and an open area of about 90%.

Referring to FIG. 8, reducing the length of the passages to 0.75 inches still provides good visco-thermal attenuation provided the aspect ratios are maintained. Still, with an opening size of 0.005 inches the acoustic absorption percentage provides substantially anechoic results for frequencies above 3000 Hz.

Referring to FIG. 9, the opening 30 has been described with reference to the example liners 22, 40 as having the width 34, 46. The widths 34, 46 describe the largest width for any shaped of the opening 30, 47. The opening may be round as indicated at 60 or rectilinear as indicated at 62. As appreciated, the round opening 60 would include a width equal to the diameter of the round opening, and the rectilinear opening 62 would include a width equal to the length of the smallest side. Accordingly, other shapes are within the contemplation of this invention.

Referring to FIG. 10, another liner assembly 50 is generally indicated and includes passages 58 that comprise a plurality of slots that extend a width 55 of the liner 50. The passages 58 include a width 56 that is much smaller than the length 52. The length 52 is on the order of 90, to 100 times greater than the width 56, and preferably greater than 500 times the width 56. The slotted liner assembly 50 provides similar acoustic performance as the open area is configured to maintain the desired open area, and include the desired length to width relationships discussed with respect to the other example liners 22, and 40 described herein.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An acoustic liner assembly comprising:
a plurality of passages each including an opening slot with each opening slot including a first width equal to a width of the liner, a second width transverse to the first width and a length, wherein a length of each of the plurality of passages is at least 50 times the second width of each of the opening slots.

2. The assembly as recited in claim 1, wherein the plurality of passages are substantially parallel with each other.

3. The assembly as recited in claim 2, wherein the plurality of passages are disposed parallel to each other.

4. The assembly as recited in claim 1, wherein the opening slots are disposed transverse to incident sound waves.

5. The assembly as recited in claim 1, wherein the opening slots for the plurality of passages combine to provide an open area for receiving incident sound waves, wherein the open area is greater than substantially 80% of the entire area of the liner assembly.

6. The assembly as recited in claim 1, wherein the ratio comprise a relationship of more than 90 to 1.

7. The assembly as recited in claim 1, wherein the passage is tapered such that a width of the passage decreases in a direction away from the opening.

8. The assembly as recited in claim 7, wherein the tapered passage comprises an electroplating of a varying thickness.

9. The assembly as recited in claim 1, wherein the liner assembly comprises a portion of an aircraft engine housing.

10. An aircraft engine housing assembly comprising:
a housing defining an inner surface; and
a liner disposed on the inner surface including a plurality of passages receiving acoustic energy incident to the inner surface, where each of said plurality of passages include an opening slot having a first width equal to an entire width of the liner, a second width transverse to the first width, and a length that is at least 50 times a width of each of the plurality of passages.

11. The assembly as recited in claim 10, wherein the length is at least 75 times the second width of each of the plurality of passages.

12. The assembly as recited in claim 10, wherein the length is at least 100 times the second width of each of the plurality of passages.

13. The assembly as recited in claim 10, wherein each of the plurality of passages is tapered such that the second width decreases in a direction away from an opening.

14. The assembly as recited in claim 10, wherein each of the plurality of passages is aligned parallel to each other.

15. An aircraft engine housing acoustic liner assembly comprising:
a liner including plurality of passages, with each of the passages including an opening width and a length at least 50 times the opening width, wherein an interior surface of each of the plurality of passages includes a coating that reduces a width of the passages in a direction away from the opening width.

16. The assembly as recited in claim 15, wherein the coating is applied in an electroplating process.

17. The assembly as recited in claim 15, wherein the coating increases thickness in a direction away from the opening width such that the width of the passage approaches zero.

* * * * *